United States Patent Office 3,419,399
Patented Dec. 31, 1968

3,419,399
PROCESS FOR FORMING A COFEE DOUGH AND DRYING SAME
Ernest L. Earle, Jr. and Howard J. Bowden, New City, Francis J. Civille, Brooklyn, and Alonzo H. R. Feldbrugge, New York, N.Y., assignors to General Foods Corporation, White Plains, N.Y., a corporation of Delaware
No Drawing. Filed Jan. 6, 1966, Ser. No. 518,996
4 Claims. (Cl. 99—71)

ABSTRACT OF THE DISCLOSURE

Frozen, aqueous, liquid particles are kneaded with dry soluble coffee to raise the moisture content of the dry coffee to between 9.5% and 12.5% at a temperature below 140° F. to form a continuous dough phase, and the dough is dried to a moisture content of between 1% and 4% while keeping the product temperature below 140° F.

---

This invention relates to an improvement of the dough process described in S.N. 497,542 filed Oct. 18, 1965 which is a continuation-in-part of S.N. 290,189, filed June 24, 1963, both applications now abondoned.

In the above case, a process is described for aromatizing coffee by forming a mixture of soluble coffee solids, volatile aromatics of coffee, and sufficient water to form a dough. The water is used as a vehicle or carrier for the volatile aromatics which are absorbed by the coffee solids. The process has the advantage that almost all of the volatile aromatics added to the coffee are retained during the drying step. The process is simple, economical and avoids the stability and taste problems of adding aromas by such methods as "plating" of coffee aromas onto a coffee powder. However, the above process has handling problems when applied on a commercial scale. If operated as a batch system the dough once formed is very difficult to remove from the mixing equipment. If operated as a continuous system, say in an extruder adapted to mix the dough and then extrude the formed dough, problems are presented in non-uniformity of the dough (the moisture not being properly distributed throughout the coffee to form a good dough), difficulty of extrusion, and difficulty in controlling the density, flavor and appearance of the final product.

It is a principal object of this invention to facilitate formation of a coffee dough in present commercial equipment.

Another object of this invention is to provide a dry soluble coffee having the physical appearance of roasted and ground coffee.

A further object of this invention is to add volatile aromas during the dough forming step and then to retain these aromas during subsequent drying of the dough.

These and other objects and advantages of the present invention will appear from the following description.

This invention is founded on the discovery that formation and extrusion of a coffee dough of uniform moisture content can be faciliated by mixing a frozen aqueous liquid in subdivided form with soluble coffee solids to raise the moisture content of said coffee to between 9.5% and 12.5%, working the mixture of coffee solids and frozen liquid into a continuous dough phase at a product temperature of below 140° F., and then drying this coffee dough to a moisture content of between 1% and 4% while keeping the product temperature below 140° F.

It is understood that the aqueous liquid may be water, dilute coffee extract, normal percolator extract or any other suitable aqueous liquid. The liquid is frozen and then ground into a granular size (less than 16 mesh U.S. Standard Sieve and preferably between 20 and 40 mesh) suitable for forming a free-flowing mixture with the dry coffee. If the frozen product is ground too small (under 40 mesh), it will be difficult to achieve a free-flowing mixture. The dry soluble coffee may be any soluble coffee, typically normal spray-dried coffee powder having a particle size of between 8 and 100 mesh. The soluble coffee may also be dry soluble coffee obtained from dearomatized extract (an extract obtained from roasted coffee subjected to an aroma removal treatment such as steam distillation of volatiles from roasted coffee).

The dry coffee and frozen particles of extract or water are uniformly blended to achieve a homogeneous mix within the critical water content stated, preferably 10.5% water and 89.5% solids. This mixture is essentially a dry blend of frozen particles of aqueous liquid (which may or may not contain volatile aromatics) and dry coffee and can be considered a discontinuous or two phase system at this point. This discontinuous phase of dry coffee particles and frozen water particles must then be formed into a continuous phase by kneading and working the dry blend. This develops enough frictional heat to melt the frozen particles and dissolves some of the dry coffee, thus forming a continuous phase or solution of soluble coffee solids and water. However, this continuous phase is formed at a temperature of below 140° F., and preferably 115° to 120° F.

The dough once formed may be dried in varous ways. Air-drying, freeze-drying or vacuum-drying may be employed. However, for most purposes a vacuum dehydration is preferred.

In the case where a final product appearance similar to roasted and ground coffee is desired the following technique should be practiced. The coffee dough is extruded into a thin layer (¼" or less, preferably ⅛") and then dried under vacuum in a two-stage operation. The first stage gives a controlled and stable one-dimensional puff (about 4–6 times its original size) as the product is dried to between 6% and 8% moisture. The partially dried coffee dough is then ground or subdivided to a particle size of between 8 and 100 mesh U.S. Standard Sieve, and then dried to a stable moisture level of less than 4%, preferably about 3% moisture. The final bulk density of the product will be about 0.15–0.35 gm./cc. compared to an original density of about 1.2–1.5 gm./cc.

It has been found that a one-dimensional puff is critical if a granular particle appearance resembling conventional roasted and ground coffee is desired. A multi-dimensional puff gives a highly porous product which does not have the desired color, coarse particle size, and particle strength necessary to simulate normal roasted and ground coffee.

To achieve a one-dimensional puff it is essential to spread or shape the formed dough, having a moisture content of 10.5% (distributed as a continuous phase throughout the coffee), into a thin layer of about ⅛" thickness and then to partially dry the layer in a vacuum of less than 100 mm. mercury and a product temperature of below 140° F. to a water content of 6–8%. During drying, the continuous phase of coffee solids and water has small gas pockets formed by the water as it vaporizes and escapes from the thick dough. This causes puffing in the direction of the escaping water vapor which takes the smallest free path of escape, in this case, a one-dimensional puff in the direction of layer thickness. Sufficient water must be removed from the coffee layer to create a stable puff which will not collapse due to too much moisture, one which will not disintegrate during grinding due to too little moisture being present, and one which will not further puff during subsequent drying due to excess moisture being present. A suitable moisture level for grinding is achieved at about 7% moisture. At this point, the puffed layer of coffee dough is ground or subdivided in stages to the final particle size distribution of conventional roasted and ground coffee (between −8 mesh and +100 mesh). The ground coffee particles are then dried in air or vacuum, preferably vacuum, to a stable moisture content.

While the present process is primarily concerned with forming a soluble coffee of different appearance than the original coffee, and preferably a coffee of lower bulk density which looks like conventional freshly roasted and ground coffee, volatile coffee aromatics may be added to the aqueous liquid prior to freezing in order to achieve an aromatized product. These aromatics may include any of the coffee volatiles given off by heating coffee, grinding the coffee, or by subjecting the coffee to vacuum. These volatiles include atmospherically steam distilled aromas such as those obtained in the Nutting Patent 2,562,206 and Mahlmann Patent 3,132,947; dry vacuum distilled aromas similar to those shown in the Lemonnier Patent 2,680,687 and vacuum steam distilled aromas similar to those shown in the patent to Mook et al. 3,035,922. These aromatics may also be combined with coffee oil in the aqueous liquid. In the case where volatile aromas are added to the coffee solids for aromatization purposes, it is important to avoid product temperatures of above 120° F. during dough formation and dehydration of the dough. Otherwise, the added aromas will be lost or degraded.

This invention will now be described by reference to the following specific example.

EXAMPLE I

Frozen aromatized soluble coffee extract was prepared for blending with soluble coffee powder. To prepare this frozen material, 31 gms. of expressed coffee oil was homogenized into 850 ml. of a 25% solids concentration coffee extract. Following this, 95 ml. of a natural distilled coffee aroma (SVF) was stirred into the homogenized liquid and then the total liquid was frozen in thin slabs at −30° F. After freezing, the ice was ground in a hammer mill to particle size finer than 30 mesh (U.S. Standard Sieve). These frozen aromatized extract particles were added to 16.5 lbs. of steam stripped soluble coffee powder having an initial moisture content of 2%. The mixture was kneaded into a dough in a heavy duty sigma blade batch mixer. Mixing time was 5 minutes and dough temperature upon completion of mixing was 120° F. The solids content of the dough at this point was 89%. The heavy dough was removed from the batch mixer and compressed into 1/8" thick strips (1" to 2" wide) in two passes through a pair of stainless steel rolls. The strips were dried to about 7.5% moisture and puffed to about 1/2" to 3/4" thickness in a Stokes vacuum tray dryer. Vacuum drying conditions were as follows: monolayer bed; platen temperature, 175° F., pressure, 30 mm. Hg, drying time, 12 minutes. The vacuum was released by admitting nitrogen gas to the drying chamber. The puffed strips were cooled to about 90° F. and ground in a Colton granulator through an 8 mesh screen (U.S. Standard Sieve). The ground particles were then finish-dried in the same Stokes vacuum dryer used for puffing. Drying conditions were as follows: bed loading, 1/4" deep; platen temperature, 210° F., pressure, 30 mm. Hg, drying time, 12 minutes. The vacuum was released by admitting nitrogen gas to the drying chamber. Product moisture was 2%.

This material was hand plated with coffee oil at a level of 0.4% and packaged in glass jars under inert gas protection. The product was stable during accelerated storage testing and on reconstitution gave an aromatic and robust cup of coffee indicating that the volatile aromas added during the process were retained.

EXAMPLE II

Frozen soluble coffee extract was prepared and ground using the technique described in the previous example. Fifty ounces of this granulated frozen extract was added to 25 lbs. of steam stripped soluble coffee powder in a 2.5 cu. ft. batch ribbon blender. The powder temperature was 75° F. The frozen material was added to the powder while the mixer was turning. Total mixing time was one minute. The blended material was removed from the mixer and thtn fed into an Ambrette Kneader-Developer (twin-screw), Model I, having the following operating characteristics:

Screw size—each 4" diameter x 18" length
Screw type—wide flights, narrow depth
Screw speed—20 r.p.m.
Die opening—8" wide x 3/4" thick The extruded dough was formed in a sheet 8" wide x 3/4" thick at a rate of about 200 lbs./hr. Dough temperature was about 115° F. The thick dough sheet was compressed to 1/8" thickness in three passes through calendering rolls. The thin sheet was cut into 1/2" wide strips. These strips were cut to usable lengths and then were puffed, ground, and dried according to the technique described in Example I. Reconstitution of the product indicated that no off-flavors had been developed during the process.

While this invention has been described by reference to specific examples, it is understood to be limited only by the scope of the appended claims.

What is claimed is:

1. A process for making a coffee dough which comprises mixing frozen particles of an aqueous liquid with dry soluble coffee solids to raise the moisture content of the coffee to between 9.5% and 12.5%, working the mixture of coffee solids and frozen liquid into a continuous dough phase at a product temperature of below 140° F., and then drying this coffee dough to a moisture content of between 1% and 4% while keeping the product temperature below 140° F.

2. The process of claim 1 wherein the frozen aqueous liquid contains volatile coffee aromatics and the dough is dried at a product temperature of below 120° F.

3. The process of claim 1 wherein the coffee dough is shaped into a layer of not more than 1/8" thickness, vacuum-dried to a moisture content of 6–8% while forming a one-dimensional puff about 4–6 times the original volume of the coffee, subdivided to a particle size of between 8 and 100 mesh U.S. Standard Sieve, and then dried to less than 4% moisture.

4. The process of claim 1 wherein the dry soluble coffee is mixed with frozen coffee extract containing volatile coffee aromatics, formed into a dough at a product temperature of below 120° F. extruded in the form of a layer of about 1/8" thickness, vacuum-dried at a pressure of less than 50 mm. Hg and a product temperature of below 120° F. to create a stable one-dimensional puff having a volume of about 4–6 times the original volume and a moisture content of about 7%, ground to a particle size of between 8 and 100 mesh U.S. Standard Sieve, and vacuum-dried to a stable moisture of below 4%.

References Cited

UNITED STATES PATENTS

| | | | |
|---|---|---|---|
| 439,318 | 10/1890 | Barotte | 99—71 |
| 1,478,940 | 12/1923 | Chalas | 99—71 |
| 2,431,496 | 11/1947 | Natelson et al. | 99—71 |
| 2,504,735 | 4/1950 | Schwarz et al. | 99—71 |
| 2,522,014 | 9/1950 | Bacat | 99—71 |
| 2,557,294 | 6/1951 | Kellogg | 99—71 |
| 2,562,206 | 7/1951 | Nutting | 99—71 |
| 2,906,630 | 9/1959 | Turkot et al. | 99—71 X |
| 3,120,439 | 2/1964 | Reale | 99—71 |

OTHER REFERENCES

Sivnamon, H. I., et al.: Food Engineering, July 1954, pp. 78, 79, 131, 132, 99–199 Lit.

MAURICE W. GREENSTEIN, *Primary Examiner.*

U.S. Cl. X.R.

99—199